United States Patent [19]

Klein et al.

[11] 4,410,869

[45] Oct. 18, 1983

[54] DIELECTRIC IMPREGNATING FLUID AND ITS USE

[75] Inventors: Alfons Klein, Duesseldorf; Karlfried Wedemeyer, Cologne; Lothar Havenith; Rolf Kron, both of Leverkusen, all of Fed. Rep. of Germany

[73] Assignee: Bayer Aktiengesellschaft, Leverkusen, Fed. Rep. of Germany

[21] Appl. No.: 361,720

[22] Filed: Mar. 25, 1982

[30] Foreign Application Priority Data

Apr. 16, 1981 [DE] Fed. Rep. of Germany ....... 3115545

[51] Int. Cl.³ .................... H01B 3/20; C07C 43/205; H01G 4/22
[52] U.S. Cl. ...................................... 336/94; 252/578; 174/17 LF; 174/25 C; 568/580; 568/635; 361/315; 361/319; 361/327
[58] Field of Search .................. 252/578; 174/17 LF, 174/25 C; 568/580, 635; 336/94; 361/315, 319, 327

[56] References Cited

U.S. PATENT DOCUMENTS

2,170,809  8/1939  Coleman et al. .................... 568/635
3,724,043  4/1973  Eustance ............................. 252/578

FOREIGN PATENT DOCUMENTS

2718905  11/1977  Fed. Rep. of Germany .
2726015  12/1977  Fed. Rep. of Germany .
2703745   8/1978  Fed. Rep. of Germany .
56-37651  9/1981  Japan .

*Primary Examiner*—John E. Kittle
*Assistant Examiner*—Robert A. Wax
*Attorney, Agent, or Firm*—Sprung, Horn, Kramer & Woods

[57] ABSTRACT

Compositions containing ditolyl ethers have outstanding dielectric properties. They are particularly suitable for use as impregnating agents in condensers.

30 Claims, No Drawings

DIELECTRIC IMPREGNATING FLUID AND ITS USE

The invention relates to compositions with advantageous dielectric properties, which can be used as impregnating agents in electrical devices.

Condensers which contain 80 to 99% by weight of monoalkylated diphenyl ether and 20 to 1% by weight of dialkylated diphenyl ether are known from German Offenlegungsschrift No. 2,718,905. The diphenyl ethers according to German Offenlegungsschrift No. 2,718 905 can only be substituted by ethyl radicals, propyl radicals and butyl radicals. Methyl-substituted diphenyl ethers are regarded as unacceptable for use as impregnating agents German Offenlegungsschrift No. 2,718,905, page 8, lines 20 to 22). The dielectric liquids described in the Offenlegungsschrift preferably contain proportions of an anti-oxidizing agent and of a hydrogen acceptor.

New compositions with dielectric properites based on alkylated diphenyl ethers, which contain ditolyl ethers, have been found.

The ditolyl ethers according to the invention can be present in the form of the pure isomers and also as a mixture of the isomers. For economic reasons, and depending on the preparation of the ditolyl ethers, an isomer mixture of the ditolyl ethers is generally preferred. The ditolyl ether according to the invention can be present as para/para isomers, meta/meta isomers, ortho/ortho isomers, para/ortho isomers, para/meta isomers and ortho/meta isomers.

The ditolyl ethers according to the invention are in themselves known and can be prepared according to known processes CH.Z. 35, 486 (1911).

The ditolyl ethers according to the invention can be prepared, for example, by the reaction of cresol-alkalimetal compounds with halogenotoluenes, if appropriate with catalysis by copper or copper salts. (J. Pharm. Sc. Japan 57 [1937] 391 to 396).

Ditolyl ether mixtures which are produced in the hydrolysis of chlorotoluenes are particularly preferred (Ing. Eng. Chem. 38, (1946), pages 254 to 261).

For example, the isomer mixtures can contain the following proportions of main constituents: 26 to 34% by weight of 2,3'-ditolyl ether, 4 to 8% by weight of 2,2'-ditolyl ether, 10 to 18% by weight of 2,4'-ditolyl ether, 18 to 28% by weight of 3,3'-ditolyl ether, 17 to 25% by weight of 3,4'-ditolyl ether and 4 to 8% by weight of 4,4'-ditolyl ether.

However, it is also possible to use ditolyl ether mixtures which have substantially lower proportions of isomers with methyl groups in the two-position. For example, these isomer mixtures have the following composition: 0 to 5% by weight of 2,3'-ditolyl ether, 0 to 4% by weight of 2,2'-ditolyl ether, 13 to 23% by weight of 2,4'-ditolyl ether, 42 to 52% by weight of 3,3'-ditolyl ether, 26 to 36% by weight of 3,4'-ditolyl ether and 2 to 9% by weight of 4,4'-ditolyl ether.

However, ditolyl ether mixtures in which particular isomers greatly predominate can also be used. For example, the following compositions should be mentioned: 58 to 77% by weight of 2,3'-ditolyl ether, 15 to 30% by weight of 2,2'-ditolyl ether and 5 to 14% by weight of 2,4'-ditolyl ether, or 2 to 6% by weight of 2,4'-ditolyl ether, 58 to 77% by weight of 3,3'-ditolyl ether, 19 to 33% by weight of 3,4'-ditolyl ether and 0 to 3% by weight of 4,4'-ditolyl ether, or 3 to 7% by weight of 3,3'-ditolyl ether, 60 to 83% by weight of 3,4'-ditolyl ether and 15 to 28% by weight of 4,4'-ditolyl ether.

It is also possible to use ditolyl ether mixtures which are formed as byproducts in the hydrolysis of pure o-chlorotoluene. Such isomer mixtures can have, for example, the following composition: 0 to 2% by weight of 2,4'-ditolyl ether, 15 to 31% by weight of 2,2'-ditolyl ether, 40 to 70% by weight of 2,3'-ditolyl ether, 15 to 25% by weight of 3,3'-ditolyl ether and 0 to 2% by weight of 3,4'-ditolyl ether.

In the hydrolysis of pure p-chlorotoluene, ditolyl ethers of the following composition can be obtained, for example, according to the invention: 19 to 38% by weight of 4,4'-ditolyl ether, 33 to 63% by weight of 3,4'-ditolyl ether, 15 to 25% by weight of 3,3'-ditolyl ether, 0 to 2% by weight of 2,2'-ditolyl ether, 0 to 2% by weight of 2,3'-ditolyl ether and 0 to 2% by weight of 2,4'-ditolyl ether.

The compositions according to the invention can additionally contain additives having a stabilizing action, particularly acid acceptors and oxidation inhibitors.

Epoxide compounds are preferred as the acid acceptors. The following epoxide compounds may be mentioned as examples: 1,2-epoxy-3-phenoxypropane, bis-(3,4-epoxy-6-methylcyclohexylmethyl) adipate, 1-epoxy-ethyl-3,4-epoxy-cyclohexane, 3,4-epoxy-cyclohexane, 3,4-epoxy-cyclohexylmethyl 3,4-epoxy-cyclohexanecarboxylate, 3,4-epoxy-6-methylcyclohexylmethyl 3,4-epoxy-6-methylcyclohexanecarboxylate and 2,2-bis-(4-hydroxyphenyl)-propane-diglycidyl ether.

In general, 0.1 to 5% by weight, preferably 0.3 to 1% by weight, of the epoxide compounds are employed, relative to the total quantity of the liquid dielectric.

In general, aromatic carbocyclic compounds having two hydroxyl groups are preferred as the oxidation inhibitors. The following oxidation inhibitors may be mentioned as examples: di-tert.-amyl-hydroquinone, 2,2-bis-(4-hydroxyphenyl)-propane and 4,4'-butylidene-bis-(6-tert.-butyl-m-cresol). The compositions according to the invention preferably contain di-tert.-amyl-hydroquinone as the oxidation inhibitor.

Preferred compositions, according to the invention, having dielectric properties can contain, for example, 90 to 110 parts by weight, particularly preferably 95 to 100 parts by weight, of the ditolyl ether, 0.05 to 2.0 parts by weight, preferably 0.1 to 1.0 part by weight, of the acid acceptor and 0.05 to 2.0 parts by weight, particularly preferably 0.1 to 1.0 part by weight, of the oxidation inhibitor.

The compositions according to the invention can be prepared, in general, by combining the components.

The invention also relates to the use of the composition according to the invention as a dielectric, particularly as an impregnating agent for electrical devices. Condensers and transformers may be particularly mentioned as electrical devices, and condensers with a construction comprising multi-layered paper and aluminium foil, metallized paper, or an optionally metallized plastic film, for example composed of polypropylene, polycarbonate or polyterephthalate, or a mixed dielectric, for example comprising paper, plastic film and aluminium foil or comprising metallized paper and plastic film may be mentioned in particular. The impregnating agents according to the invention can preferably be used for condensers which contain plastic film as the solid dielectric (all-film condensers).

The compositions, according to the invention, having dielectric properties have distinct advantages in comparison with the diphenyl ethers known from German Offenlegungsschrift No. 2,718,905. Thus, for example, the compositions according to the invention have a higher dielectric constant and a more favourable low temperature viscosity behaviour.

Surprisingly, the compositions according to the invention can therefore particularly advantageously be employed for impregnating condensers. Because of the higher dielectric constant, the compositions according to the invention can particularly advantageously be used for impregnating condensers constructed from metallized paper.

The compositions, according to the invention, having dielectric properties can be readily degraded biologically and therefore do not pollute the environment.

The dielectric liquid used as an additional dielectric should provide a rapid and complete impregnation of the roll in condensers which contain plastic film, mostly one or more layers of polypropylene film, as the solid dielectric. During the impregnation process, which is usually carried out at a low temperature under vacuum, all cavities and gaps in the dielectric roll have to be filled with the dielectric liquid. According to U.S. Pat. No. 3,363,156 the use of a liquid impregnating agent with a relatively high viscosity is problematic and undesirable in this process. A low viscosity of the impregnating agent is desirable and facilitates, in general, penetration over the edges of the dielectric roll, spreading into the gaps between the coatings and the solid plastic dielectric, and an advantageous penetration of the plastic film.

Since the viscosity increases with decreasing temperature, the properties of the electrical devices which are impregnated with a liquid of high viscosity become poorer at low temperatures. During this process, crystalline or amorphous deposits can form in the liquid dielectric at relatively low temperatures and can cause an inhomogeneity in the liquid dielectric. Finally, the liquid dielectric can shrink at low temperatures owing to a decrease in volume, and can cause the formation of cavities. The result is an increase in temperature and a reduction in the dielectric strength of the dielectric device, which finally causes a premature undesired breakdown.

EXAMPLES

The surprising properties of the dielectric liquids according to the invention are compared with a diphenyl ether known from German Offenlegungsschrift No. 2,718,905.

The dielectric liquids A to C within the scope of the present invention have the following composition:

| Isomer | A | B | C |
|---|---|---|---|
| Unknown compound | 0.8% | 0.3% | 0.3% |
| 2,2'-Dimethyl-diphenyl ether | 5.1% | — | 12.2% |
| 2,3'-Dimethyl-diphenyl ether | 26.9% | — | 58.2% |
| 2,4'-Dimethyl-diphenyl ether | 11.6% | 0.2% | 2.1% |
| 3,3'-Dimethyl-diphenyl ether | 26.9% | 8.1% | 25.8% |
| 3,4'-Dimethyl-diphenyl ether | 23.5% | 63.7% | 1.4% |
| 4,4'-Dimethyl-diphenyl ether | 5.2% | 27.6% | — |

D corresponds to a diphenyl ether which is known from German Offenlegungsschrift No. 2,718 905 and which has the following composition: monoisopropyl-diphenyl ether 86.6% by weight, diisopropyl-diphenyl ether 13.4% by weight.

TABLE 1

|  | A | B | C | D |
|---|---|---|---|---|
| Relative dielectric constant DC |  |  |  |  |
| 20° C. | 3.60 | 3.82 | 3.30 | 3.18 |
| 90° C. | 3.20 | 3.32 | 2.96 | 2.85 |
| Kinematic viscosity ($mm^2.sec^{-1}$) |  |  |  |  |
| 20° C. | 5.8 | 5.2 | 6.1 | 7.8 |
| 0° C. | 14.3 | — | — | 20.7 |
| −10° C. | 25.2 | 19.2 | 30.0 | 41.8 |
| −25° C. | 77.0 | 62.6 | 111.5 | 204.9 |

What is claimed is:

1. In an apparatus having a dielectric, the improvement wherein said dielectric comprises an isomeric mixture of ditolyl ethers.

2. An apparatus according to claim 1, wherein said apparatus additionally contains an oxidation inhibitor.

3. An apparatus according to claim 1, wherein said apparatus additionally contains a hydroquinone derivative.

4. An apparatus according to claim 1, wherein said apparatus additionally contains an acid acceptor.

5. An apparatus according to claim 4, wherein said apparatus contains a hydroquinone derivative.

6. An apparatus according to claim 1, wherein said apparatus contains 0.05 to 2.0 parts by weight of an oxidation inhibitor and 0.05 to 2.0 parts by weight acid acceptor.

7. An apparatus according to claim 1, wherein said apparatus contains 2,2-bis-(4-hydroxyphenyl)-propane-diglycidyl ether and di-tert.-amyl-hydroquinone.

8. An apparatus according to claim 1, wherein said dielectric comprises an isomeric mixture of ditolyl ethers of the following composition:
26–34% by weight of 2,3' ditolyl ether
4–8% by weight of 2,2' ditolyl ether
10–18% by weight of 2,4' ditolyl ether
18–28% by weight of 3,3' ditolyl ether
17–25% by weight of 3,4' ditolyl ether
4–8% by weight of 4,4' ditolyl ether,
the weights being on the basis of the total amounts of ditolyl ethers present in said dielectric.

9. An apparatus according to claim 1, wherein said dielectric comprises a mixture of ditolyl ethers having the following composition:
0–5% by weight of 2,3' ditolyl ether
0–4% by weight of 2,2' ditolyl ether
13–23% by weight of 2,4' ditolyl ether
42–52% by weight of 3,3' ditolyl ether
26–36% by weight of 3,4' ditolyl ether
2–9% by weight of 4,4' ditolyl ether,
the weights being expressed based upon the total amounts of ditolyl ethers in the dielectric.

10. An apparatus according to claim 1, wherein said dielectric comprises a mixture of ditolyl ethers of the following composition:
58–77% by weight of 2,3' ditolyl ether
15–30% by weight of 2,2' ditolyl ether
5–14% by weight of 2,4' ditolyl ether,
the weights being based upon the combined amounts of ditolyl ethers present in the dielectric.

11. An apparatus according to claim 1, wherein said dielectric comprises a mixture of ditolyl ethers of the following composition:

2–6% by weight of 2,4' ditolyl ether
58–77% by weight of 3,3' ditolyl ether
19–33% by weight of 3,4' ditolyl ether
0–3% by weight of 4,4' ditolyl ether,
the weights being based upon the combined amounts of ditolyl ethers present in the dielectric.

12. An apparatus according to claim 1, wherein said dielectric comprises a mixture of ditolyl ethers of the following composition:
3–7% by weight of 3,3' ditolyl ether
60–83% by weight of 3,4' ditolyl ether
15–28% by weight of 4,4' ditolyl ether,
the weights being based upon the combined amounts of ditolyl ethers present in the dielectric.

13. An apparatus according to claim 1, wherein said dielectric comprises a mixture of ditolyl ethers of the following composition:
0–2% by weight of 2,4' ditolyl ether
15–31% by weight of 2,2' ditolyl ether
40–70% by weight of 2,3' ditolyl ether
15–25% by weight of 3,3' ditolyl ether
0–2% by weight of 3,4' ditolyl ether,
the weights being based upon the combined amounts of ditolyl ethers present in the dielectric.

14. An apparatus according to claim 1, wherein said dielectric comprises a mixture of ditolyl ethers of the following composition:
19–38% by weight of 4,4' ditolyl ether
33–63% by weight of 3,4' ditolyl ether
15–25% by weight of 3,3' ditolyl ether
0–2% by weight of 2,2' ditolyl ether
0–2% by weight of 2,3' ditolyl ether
0–2% by weight of 2,4' ditolyl ether,
the weights being based upon the combined amounts of ditolyl ethers present in the dielectric.

15. An apparatus according to claim 1, wherein said apparatus is a condenser.

16. An apparatus according to claim 1, wherein said apparatus is a transformer.

17. An apparatus according to claim 17, wherein said condenser comprises plastic film which is impregnated by said ditolyl ether.

18. A composition comprising an isomeric mixture of ditolyl ethers.

19. A composition according to claim 20, comprising:
26–34% by weight of 2,3' ditolyl ether
4–8% by weight of 2,2' ditolyl ether
10–18% by weight of 2,4' ditolyl ether
18–28% by weight of 3,3' ditolyl ether
17–25% by weight of 3,4' ditolyl ether
4–8% by weight of 4,4' ditolyl ether,
the weights being on the basis of the total amounts of ditolyl ethers present in said composition.

20. A composition according to claim 18, comprising:
0–5% by weight of 2,3' ditolyl ether
0–4% by weight of 2,2' ditolyl ether
13–23% by weight of 2,4' ditolyl ether
42–52% by weight of 3,3' ditolyl ether
26–36% by weight of 3,4' ditolyl ether
2–9% by weight of 4,4' ditolyl ether,
the weights being on the basis of the total amounts of ditolyl ethers present in said composition.

21. A composition according to claim 18, comprising:
58–77% by weight of 2,3' ditolyl ether
15–30% by weight of 2,2' ditolyl ether
5–14% by weight of 2,4' ditolyl ether,
the weights being on the basis of the total amounts of ditolyl ethers present in said composition.

22. A composition according to claim 18, comprising:
2–6% by weight of 2,4' ditolyl ether
58–77% by weight of 3,3' ditolyl ether
19–33% by weight of 3,4' ditolyl ether
0–3% by weight of 4,4' ditolyl ether,
the weights being based upon the combined amounts of ditolyl ethers present in said composition.

23. A composition according to claim 18, comprising:
3–7% by weight of 3,3' ditolyl ether
60–83% by weight of 3,4' ditolyl ether
15–28% by weight of 4,4' ditolyl ether,
the weights being based upon the combined amounts of ditolyl ethers present in said composition.

24. A composition according to claim 18, comprising:
0–2% by weight of 2,4' ditolyl ether
15–31% by weight of 2,2' ditolyl ether
40–70% by weight of 2,3' ditolyl ether
15–25% by weight of 3,3' ditolyl ether
0–2% by weight of 3,4' ditolyl ether,
the weights being upon the combined amounts of ditolyl ethers present in said composition.

25. A composition according to claim 18, comprising:
19–38% by weight of 4,4' ditolyl ether
33–63% by weight of 3,4' ditolyl ether
15–25% by weight of 3,3' ditolyl ether
0–2% by weight of 2,2' ditolyl ether
0–2% by weight of 2,3' ditolyl ether
0–2% by weight of 2,4' ditolyl ether,
the weights being based upon the combined amounts of ditolyl ethers present in said composition.

26. A composition according to claim 18, containing an oxidation inhibitor.

27. A composition according to claim 18, containing a hydroquinone derivative.

28. A composition according to claim 18, containing an acid acceptor.

29. A composition according to claim 18, containing 0.05 to 2.0 parts by weight of an oxidation inhibitor and 0.05 to 2.0 parts by weight of an acid acceptor.

30. A composition according to claim 18, containing 2,2-bis-(4-hydroxyphenyl)-propane-diglycidyl ether and di-tert.-amyl-hydroquinone.

* * * * *